(12) United States Patent
Francisco et al.

(10) Patent No.: US 8,751,879 B2
(45) Date of Patent: Jun. 10, 2014

(54) INTELLIGENTLY MONITORING AND DISPATCHING INFORMATION TECHNOLOGY SERVICE ALERTS

(75) Inventors: Carlos Alberto Francisco, Campinas (BR); Sergio Antonio Toso Junior, Campinas (BR); Adan Rosler, Campinas (BR); Thiago Cesar Rotta, Catanduva (BR)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 13/075,464

(22) Filed: Mar. 30, 2011

(65) Prior Publication Data
US 2012/0254671 A1 Oct. 4, 2012

(51) Int. Cl.
*G06F 11/00* (2006.01)

(52) U.S. Cl.
USPC ............... 714/57; 714/26; 714/39; 714/48; 705/35; 705/7.27; 726/22

(58) Field of Classification Search
USPC ............... 714/48, 26, 39, 57; 705/35, 7.27; 726/22
See application file for complete search history.

(56) References Cited

U.S. PATENT DOCUMENTS

| | | | |
|---|---|---|---|
| 5,107,499 A * | 4/1992 | Lirov et al. ............... | 714/26 |
| 6,044,355 A | 3/2000 | Crockett et al. | |
| 7,110,525 B1 | 9/2006 | Heller et al. | |
| 7,139,938 B2 * | 11/2006 | Marwaha ............... | 714/48 |
| 2003/0055768 A1 | 3/2003 | Anaya et al. | |
| 2003/0200486 A1 * | 10/2003 | Marwaha ............... | 714/39 |
| 2004/0181685 A1 * | 9/2004 | Marwaha ............... | 713/201 |
| 2005/0055697 A1 | 3/2005 | Buco et al. | |
| 2006/0177808 A1 * | 8/2006 | Aosawa et al. ............... | 434/322 |
| 2006/0188086 A1 | 8/2006 | Busey et al. | |
| 2007/0078970 A1 * | 4/2007 | Zabihi et al. ............... | 709/224 |
| 2007/0299717 A1 * | 12/2007 | Yamamoto et al. ............. | 705/10 |
| 2008/0120129 A1 * | 5/2008 | Seubert et al. ............... | 705/1 |
| 2008/0209431 A1 | 8/2008 | La Vecchia et al. | |
| 2009/0254914 A1 | 10/2009 | Sundaresan et al. | |
| 2010/0118741 A1 * | 5/2010 | Youn et al. ............... | 370/259 |
| 2010/0120392 A1 * | 5/2010 | Youn et al. ............... | 455/404.1 |

OTHER PUBLICATIONS

SAP (NetWeaver 2004) 2004, SAP, pp. 1-38.*
SAP (SAP Web Application Server) 2002, SAP, pp. 1-26.*
Gechter, Jerry. "Enterprise skills routing: A better solution for today's call center." Feb. 1997. Date printed May 17, 2010. <http://findarticles.com/p/articles/mi_qa3700/is_199702/ai_n8749589/>.
"HP Operations Manager Software." Hewlett-Packard Development Company, LP. 2010. Date printed Oct. 15, 2010. <https://h10078.www1.hp.com/cda/hpms/display/main/hpms_content.jsp?zn=bto&cp=1-11-15-28^1745_4000_100 >.

(Continued)

*Primary Examiner* — Joshua P Lottich
*Assistant Examiner* — Jeison C Arcos
(74) *Attorney, Agent, or Firm* — Nicholas L. Cadmus; Ronald Kaschak

(57) ABSTRACT

In a method for intelligently monitoring and dispatching an Information Technology (IT) service alert, a computer receives a service error alert and classifies the service error alert. The computer assigns the service error alert, based on the service error alert class. The computer monitors the progress of the resolution of the service error alert.

17 Claims, 8 Drawing Sheets

(56) References Cited

OTHER PUBLICATIONS

"Tivoli Netcool/OMNIbus." IBM. Date printed Oct. 15, 2010. <http://www-01.ibm.com/software/tivoli/products/netcool-omnibus/index.html>.

"Teltronics Intelligent Service Level Management (iSLM) Solution." Teltronics, Inc. 2009. Date printed Oct. 14, 2010. <http://www.teltronics.com/islm_management_dashboards.asp>.

Dugdale, Addy. "Smart IBM Software Could Rescue You from Dumb Call Center Hell." Fast Company.com. Mar. 18, 2010. Date printed Oct. 15, 2010. <http://www.fastcompany.com/1588003/ibm-attempts-to-ramp-up-consumer-love-for-call-center-hell>.

"IBM Real-Time Analytics Matching Platform (RAMP)." IBM. Web. Oct. 15, 2010. <http://www-935.ibm.com/services/us/index.wss/offerfamily/gbs/a1031968>.

* cited by examiner

INTELLIGENTLY MONITORING AND DISPATCHING INFORMATION TECHNOLOGY SERVICE ALERTS

FIELD OF THE INVENTION

The invention relates generally to Information Technology (IT) service alerts. More specifically, the invention relates to monitoring and dispatching IT service alerts.

BACKGROUND

Information Technology (IT) systems and programs services occasionally experience hardware and software errors while they are in operation. These errors include random hardware system failures, software programming discrepancies, or a combination of both. When a user of the IT service detects an error, the user may contact a help service that is assigned to that specific IT service. The user may contact the help service by telephone or by e-mail, for example. The user must then provide the help service with the specific details of the error detected. The error reported to the help service placed in a general queue before randomly assigning the alert to an analyst for processing. Alternatively, the error alerts can be assigned to a help service coordinator. In the latter case, the coordinator classifies the error using several parameters, such as criticality, and then assigns the error to an analyst for processing.

Randomly assigning an error to an analyst is not efficient, however. For example, certain analysts may have specific skills or experiences that enable them to more efficiently process certain errors as compared to other analysts. Moreover, different analysts have different workload capacities, and therefore, process errors in different manners. Randomly assigning errors to analysts from a queue does not take these factors into consideration. Similarly, utilizing a help service coordinator to assign errors to analysts is not efficient. A help service coordinator is prone to making mistakes in categorizing and properly assigning the errors to the analysts. Furthermore, either scenario may create unnecessary delays in getting errors assigned to analysts.

SUMMARY

In a first embodiment of the present invention, there is a computer system for intelligently monitoring and dispatching Information Technology (IT) service alerts. The system comprises one or more processors, one or more computer-readable memories, one or more computer-readable tangible storage devices, and program instructions stored on at least one of the one or more storage devices for execution by at least one of the one or more processors via at least on of the one or more memories. The program instructions comprise first program instructions to receive a service error alert. The program instructions comprise second instructions to classify the received service error alert. The program instructions comprise third program instructions to assign the service error alert based on the service error alert classification. The program instructions comprise fourth program instructions to monitor the progress of the resolution of the service error alert.

In a second embodiment of the invention, there is a method for intelligently monitoring and dispatching Information Technology (IT) service alerts. The method comprises a computer receiving a service error alert. The method comprises a computer classifying the received service error alert. The method comprises a computer assigning the service error alert, based on the service error alert classification. The method comprises a computer monitoring the progress of the resolution of the service error alert.

In a third embodiment of the invention, there is a computer program product for intelligently monitoring and dispatching Information Technology (IT) service alerts. The computer program product comprises first program instructions to receive a service error alert. The computer program product comprises second instructions to classify the received service error alert. The computer program product comprises third program instructions to assign the service error alert based on the service error alert classification. The computer program product comprises fourth program instructions to monitor the progress of the resolution of the service error alert.

DETAILED DESCRIPTION

Figure 1:
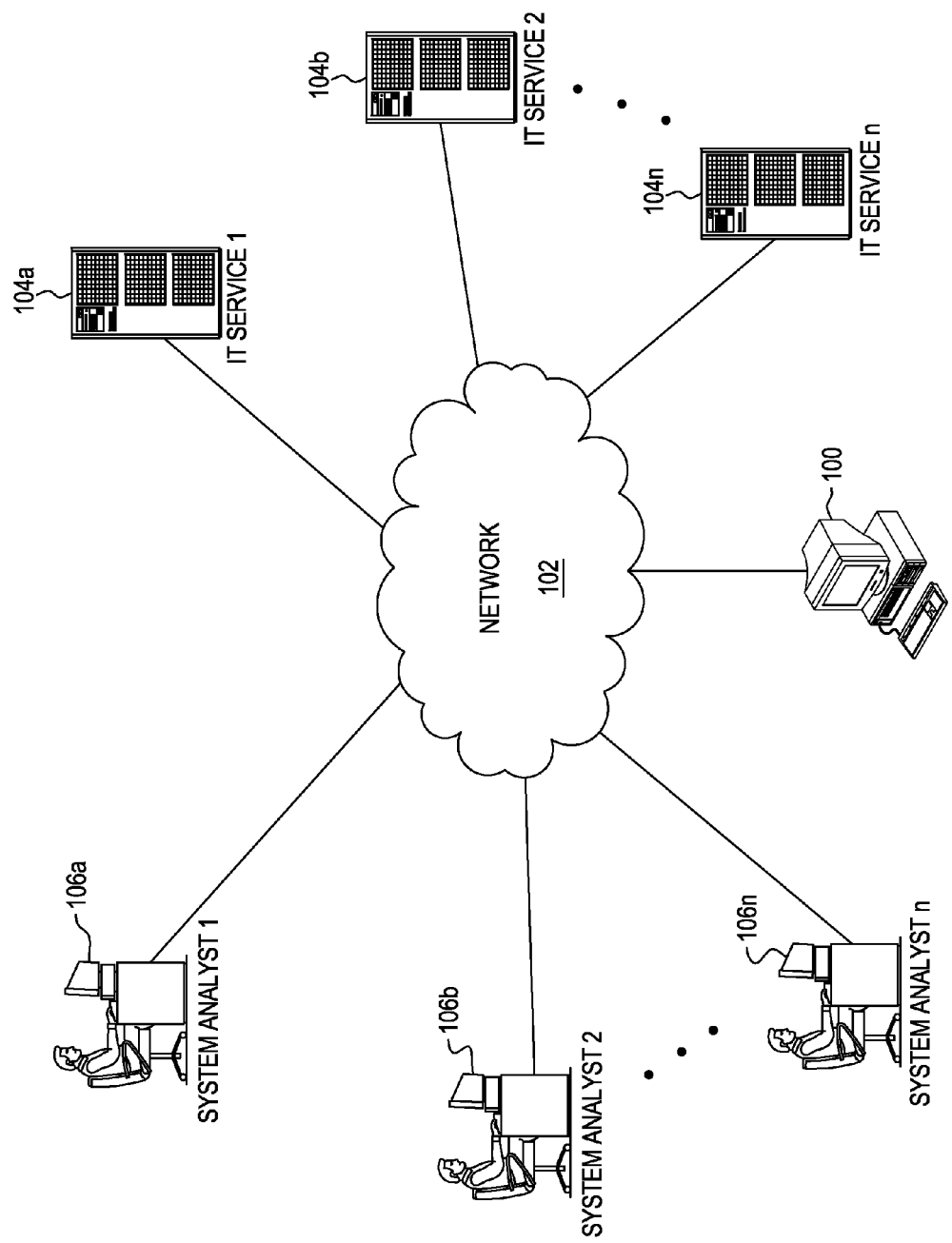
FIG. 1 illustrates a computer system for intelligently monitoring and dispatching Information Technology service alerts, according to one embodiment of the present invention.

The present invention will now be described in detail with reference to the Figures. FIG. 1 illustrates a computer system 100 for intelligently monitoring and dispatching Information Technology alerts, according to one embodiment of the present invention. Computer system 100 monitors a plurality of Information Technology (IT) services 104*a*-104*n* via network 102. Upon receiving an alert from one of the monitored IT service 104*a*-*n*, computer system 100 assigns the alert to one of a plurality of system analysts 106*a*-106*n* for processing.

Figure 2:
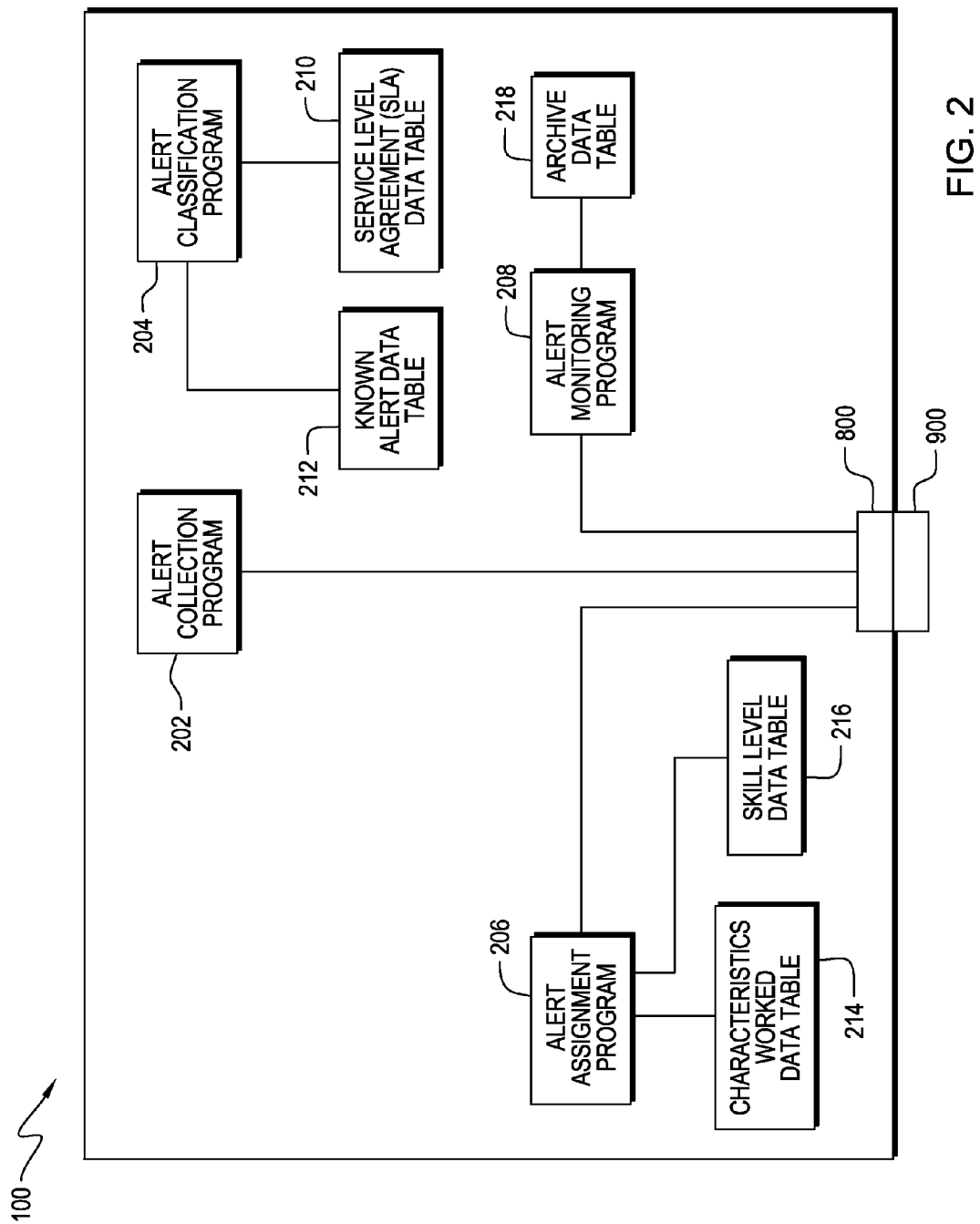
FIG. 2 illustrates in more detail the computer system of FIG. 1 for intelligently monitoring and dispatching Information Technology service alerts, according to one embodiment of the present invention.

FIG. 2 illustrates in more detail the computer system 100 of FIG. 1 for intelligently monitoring and dispatching Information Technology alerts, according to one embodiment of the present invention. Computer system 100 includes an Alert Collection Program 202 for receiving and displaying in a single common view, Information Technology (IT) service error alerts generated by monitored IT services. Service error alerts can be alerts concerning hardware, software, or a combination of hardware and software. System Analysts responsible for resolving alerts may see the common view of all received alerts, their own queue of alerts, or both at the same time. Alert collection program 202 may receives IT service Alerts either through manual input, or from IT system monitors that have previously been installed within the monitored IT service. In example embodiments of the invention, alerts collection program 202 may receive an alert from one IT service 104a or from a plurality of IT services 104a-n.

Computer system 100 includes an alert classification program 204 for categorizing the type of the alert as being hardware or software related, or a combination of both. Alert classification program 204 also determines if the alert collected is a repeated, known, false, or normal alert. Alert classification program 204 identifies an alert as a repeated if alert classification program 204 previously received and processed an identical alert. Alert classification program 204 does not process a repeated alert but rather discards any repeated alerts. Similarly, alert classification program 204 does not process known alerts. Known alerts are handled automatically, and therefore, do not require system analyst intervention. A known alert may be, for example, an alert indicating that a storage system is nearing capacity. Alert classification program 204 compares received alerts to alerts stored in a known alerts data table 212 to determine if the alert is a known alert. Alert classification program 202 does not process false alerts. As an example, two identical servers may be running identical services. If the services both issue alerts simultaneously, alert classification program 202 may determine one alert to be a normal alert while the determining the second alert to be a false alert since it's a duplicate.

Computer system 100 includes a service level agreement (SLA) data table 210 for storing a service level agreement (SLA) corresponding to each monitored IT service 104a-104n. An SLA defines an expected level of a service from a monitored IT service. Alert classification program 204 uses parameters obtained from an SLA in SLA data table 210 to determine the severity and type of a received alert. In an example embodiment, SLA parameters may be defined by a systems administrator if an SLA has not been pre-defined for a monitored IT service. As will be discussed, SLA parameters are also beneficial for assigning service alerts to analysts as well as for directing the analyst to the IT services alert documentation to enhance service and productivity. In one example, alert classification program 204 determines the severity of the alert based on descriptions of the severity of the alert, specific time periods wherein the alert must begin processing, and specific time limits for resolution of the alert.

Computer system 100 includes the known alerts data table 212, for storing characteristics of all received alerts, including repeated, known, false, and normal alerts. The relevant characteristics are identified and then used to establish the severity of the alert to be processed. Relevant characteristics include, for example, system name, account name, arrived date and time, description of the error contained in the alert, and message code.

Each characteristic has a value related to its complexity called Characteristic Severity. Complexity relates to the nature of the alert, for example, the service being monitored has 'crashed', and is assigned a value of 0-5, with 0 being the lowest priority and 5 as the highest priority. This value is calculated using the formula:

Characteristic Severity=Sum of all characteristics' severities/the number of characteristics.

The sum of all characteristics' severities is the sum of all of the characteristics' severities in the alert, and the number of characteristics is the sum of all characteristics in the alert.

Criticality relates to the time to resolve the normal alert. Alert Criticality ranges from 0 to 5, with 0 being the lowest criticality and 5 the highest criticality. Alert Criticality is calculated using the formula:

Alert Criticality=Sum of all criticalities/the number characteristics

A Final Alert Severity is determined based on the Characteristic Severity and the Alert Criticality. Final Alert Severity also has a range of 0-5, with 0 being the lowest Final Alert Severity, and 5 being the highest. The Final Alert Severity is calculated by using the average between the Characteristic Severity and the Alert Criticality:

Final Alert Severity=(Alert Criticality+Characteristics Severity)/2

Final Alert Severity establishes the status of the alert as being either Normal or High priority. Alerts classified as Normal, have less than 80% of the maximum possible value, 5, and High Priority alerts are those equal to or greater than 80% of the maximum possible value. When displayed in a user display, the background color of each type of alert may be different. For example, High priority alerts may be displayed in red, while Normal priority alerts may be displayed in blue. This allows the analysts to more easily and quickly identify an alert status.

Priority of Action establishes a ranking for the alert using the formula:

Priority of Action=SLA Time Spent/SLA Time Allowed*Final Alert Severity

SLA Time Spent is the amount time that has already passed. SLA Time Allowed is the time allowed to resolve the alert as defined in an SLA. The Priority of Action helps determine the order in which alerts are processed.

Computer system 100 includes an alert assignment program 206 for dispatching alerts to a proper analyst for resolution. A characteristics worked data table 214 tracks all of the alert characteristics that an analyst has processed. When an analyst has previously processed a characteristic, alert assignment program 206 assigns a 1 to the analyst. If the analyst has not worked on a specific characteristic, alert assignment program 206 assigns a 0 to the analyst.

Computer system 100 also includes a skill level data table 216 for storing a skill level score for each analyst. A skill level indicates an analyst's ability to process alerts. There are three skill levels and assigned values:

Beginner (Value=1)

Intermediate (Value=2)

Advanced (Value=3)

Using normal accepted human resource methods, all analysts' skill levels are periodically reviewed and updated accordingly in skill level data table 216 by a system administrator.

Alert assignment program 206 selects the best analyst to process the alert by determining which analysts are currently online and the actual workload of each analyst at the time the new alert is being processed. Workload is calculated as the sum of the alert severities from each alert currently being handled by the analyst, using the formula:

Workload=Sum of the Severities of all Alerts in the Analyst Queue

The formula to assign the analyst is:

Analyst Score=Workload/(Skill Level+Characteristics Severity)

The best choice to process the alert is the analyst with the lowest analyst score. Alert assignment program 206 forwards the alert and all data related to the alert to the selected analyst for processing.

Computer system 100 includes an alert monitoring program 208 for continuously monitoring an assigned alert to ensure that action has been taken by the assigned analyst to begin processing the alert within the predefined SLA guidelines. An analyst has an option to reject the alert upon being assigned the alert, in which case alert monitoring program 208 may re-assign the alert to a different analyst. If no other analysts are available for re-assigning, the alert is retained by the originally assigned analyst and the alert monitoring program 208 reorganizes the analyst's work queue to reflect the new priority.

While alert assignment program 206 assigns an alert to an analyst to process an alert, a common view of all alerts is available to all analysts in a display. All alerts are ranked in the common view according to the priority that has been calculated. The advantage of this common view and ranking can be seen with the following example. When an analyst completes processing an alert and alert assignment program 206 does not have a new alert to assign to the analyst, the analyst is able to see the common view of alerts and select the next alert in the common view priority list. Since all alerts are assigned, when the available analyst selects an alert to process, that alert is removed from the queue of the originally assigned analyst.

Although a common queue of alerts has been described as being organized by priority, it should be understood that the common queue can also be organized according to other values; for example, the remaining time before the SLA expires, alert weight, or by a classification of the alerts. In one example, an analyst may organize the queue manually.

Computer system 100 includes an archive data table 218 for storing information about the processed alert, such as time spent on resolution or actions taken. Archive data table 218 can be accessed later for investigations and metrics generation. Relevant characteristics of the processed alert are stored in the characteristics worked data table 214, updating the information about the analyst's experience with this characteristic. Computer system 100 also includes internal components 800 and external components 900.

Figure 3:
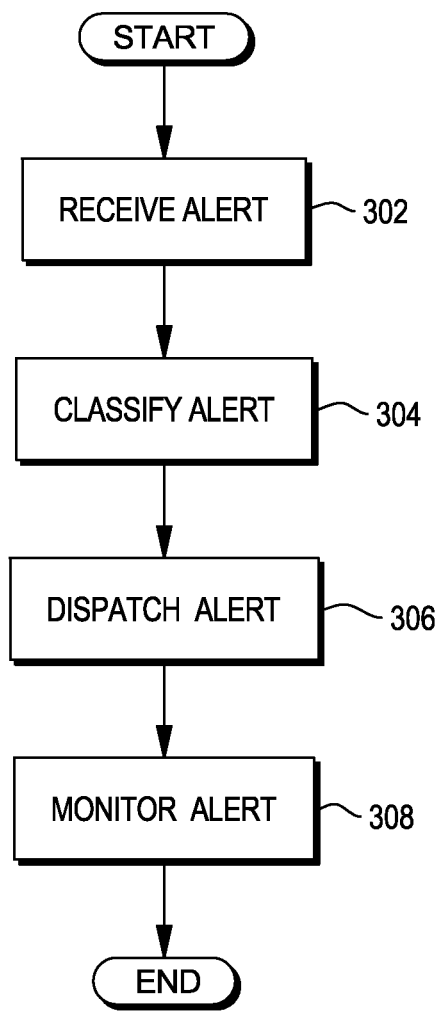
FIG. 3 is a flow chart illustrating the steps for monitoring and dispatching Information Technology service alerts, according to one embodiment of the present invention.

FIG. 3 is a flow chart illustrating the steps for monitoring and dispatching Information Technology (IT) service alerts. At step 302, alert collection program 202 receives an IT service alert. At step 304, alert classification program 204 analyzes the received alert and designates its type and severity according to its characteristics. At step 306, alert assignment program 206 selects an appropriate analyst based on the designated alert type and severity and dispatches the alert to the selected analyst. Once the alert is assigned to an analyst, alert monitoring program 208 monitors the alert, at step 308, to ensure a timely response. If the alert is not handled according to a predetermined response time in the SLA, alert dispatch program either re-routes the alert to a different analyst or reorganizes the currently assigned analyst's work queue.

Figure 4:
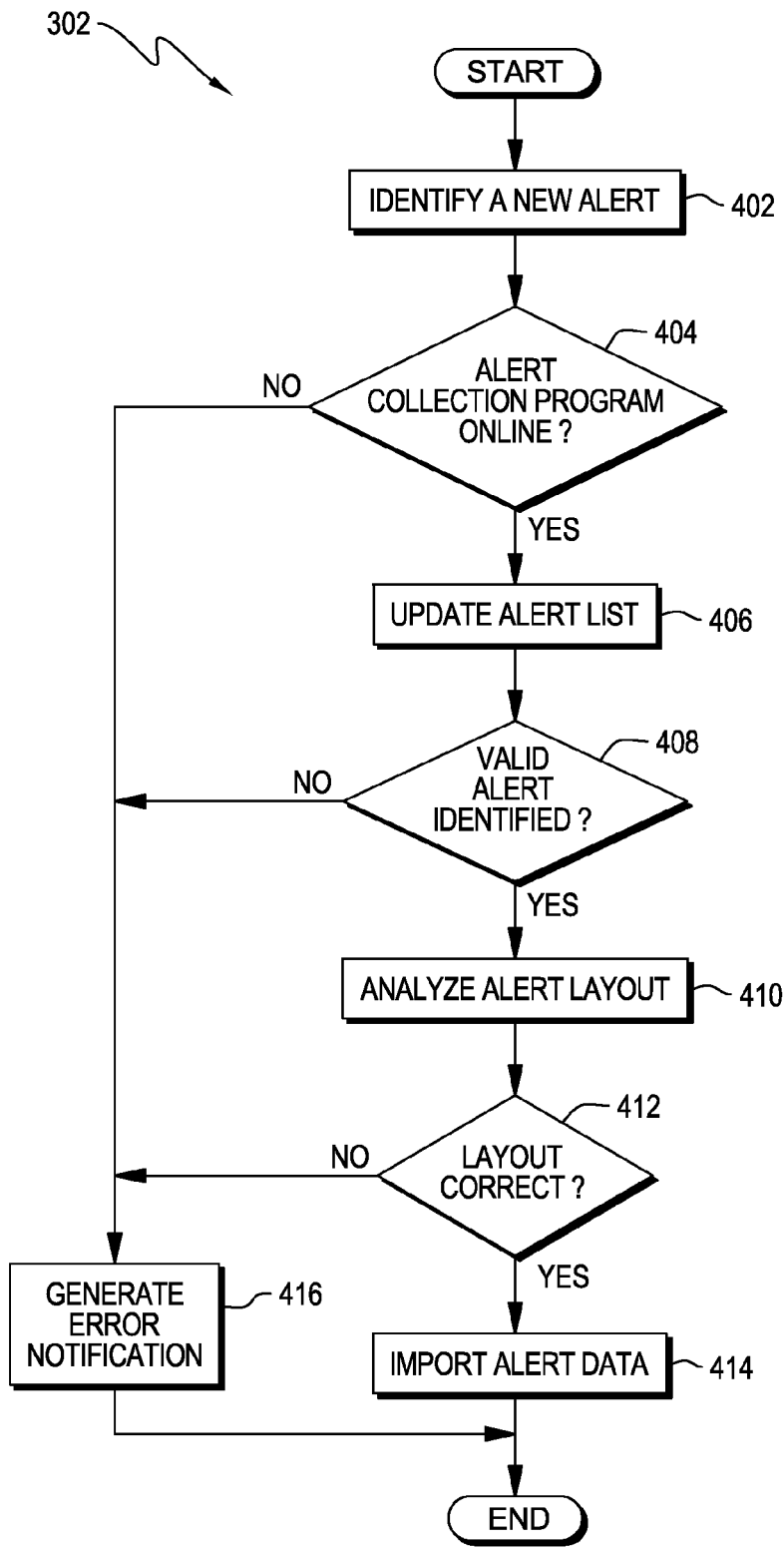
FIG. 4 illustrates in more detail the steps performed by alerts collection program of FIG. 2 for intelligently monitoring and dispatching Information Technology service alerts, according to one embodiment of the present invention.

FIG. 4 illustrates in more detail step 302 of FIG. 3 performed by alerts collection program 202 of FIG. 2 for intelligently monitoring and dispatching Information Technology service alerts, according to one embodiment of the present invention. Alert collection program 202 receives alerts from several different sources either automatically or manually. Manual alerts are related to special requests received by a dispatcher or team member that inputs the following minimum information: customer name, system name, alert type, and alert description. Alerts submitted automatically can come from different platforms and varied collection techniques, and again, contain the minimum information as stated above. At step 402, alert collection program, 202 identifies a new alert. If the alert collection program 201 is online (decision 404, yes branch), alert collection program 202 updates an alerts list, at step 406, with the new alert. If alert collection program 202 identifies a valid alert (decision 408, yes branch), alert collection program 202 analyzes the alert layout at step 410. If alert collection program 202 determines that the alert layout is correct (decision 412, yes branch) alert collection program 202 then imports the received alert for processing at step 414. If alert collection program 202 is not online (decision 404, no branch), does not identify a valid alert (decision 408, no branch), or does not determine a correct alert layout (decision 412, no branch), alert collection program 202 generates an error notification at step 416 and notifies an analyst team lead or a systems administrator.

In production environments that are supported by a monitoring tool, agents identify and collect alerts, which then redirect the alerts to alert collection program 202.

Figure 5:
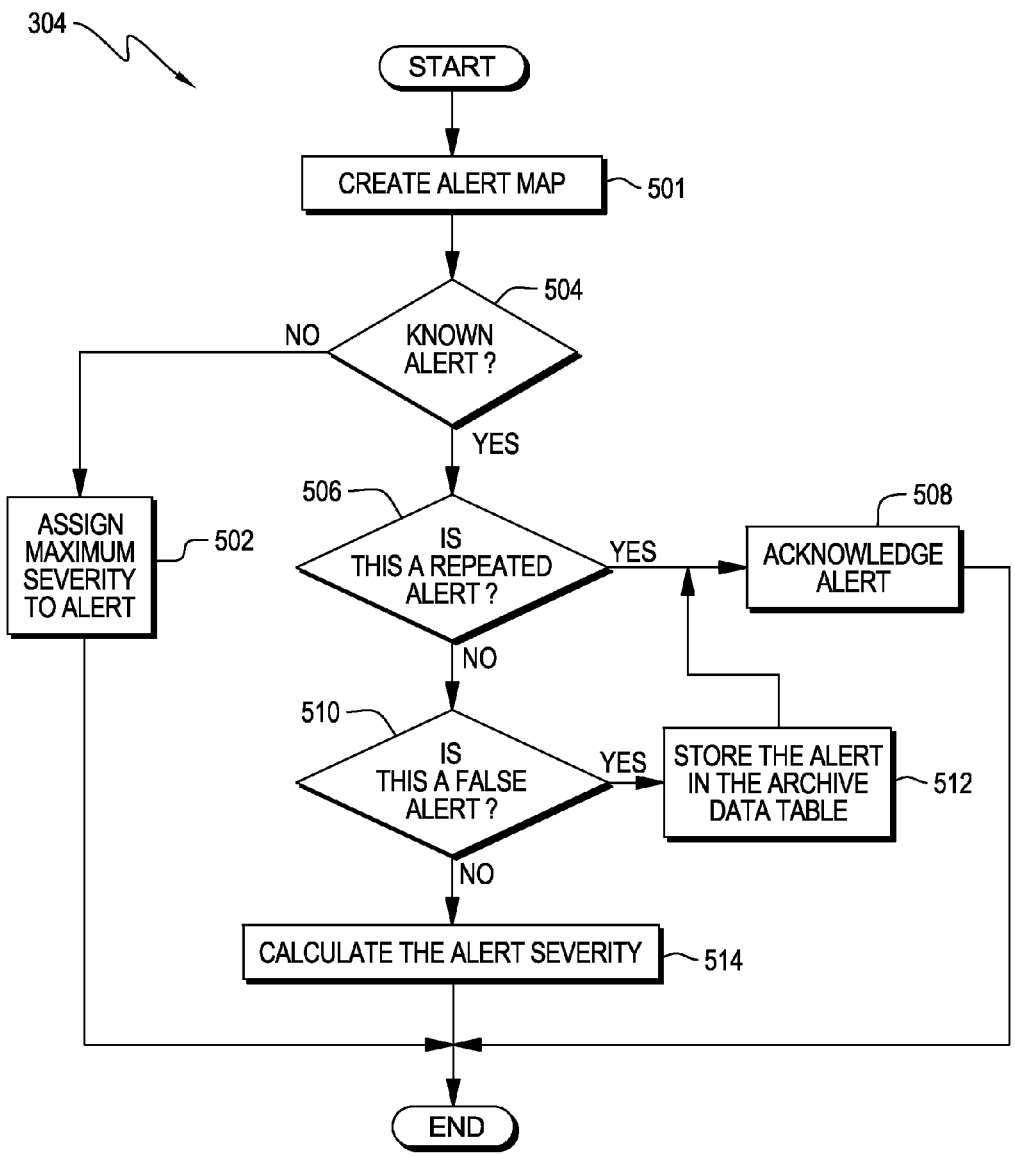
FIG. 5 illustrates in more detail the steps performed by alert classification program of FIG. 2 for intelligently monitoring and dispatching Information Technology service alerts, according to one embodiment of the present invention.

FIG. 5 illustrates in more detail step 304 of FIG. 3 performed by alert classification program 204 of FIG. 2 for intelligently monitoring and dispatching Information Technology service alerts, according to one embodiment of the present invention. At step 501, alert classification program 204 creates an alert map by identifying the alert's relevant characteristics. Relevant characteristics include, for example, system name, account name, arrived date and time, description of the error contained in the alert, and message code. Alert classification program 204 identifies relevant characteristics by accessing known alerts data table 212. If alert classification program 204 determines that an alert is not known (decision 504, no branch) alert classification program assigns the alert a maximum alert severity of 5, at step 502. This ensures that the determined unknown alert is handled with high priority.

If alert classification program 204 determines that the alert is known (decision 504, yes branch) and that the alert is a repeated alert (decision 506, yes branch), then alert classification program 204 acknowledges the alert, at step 508. If alert classification program 204 determines that the alert is not a repeated alert (decision 506, no branch) and that the alert is a false alert (decision 510, yes branch), then alert classification program 204 stores the false alert in archive data table 218, at step 512, and acknowledges the alert, at step 508. If alert classification program 204 determines that the alert is not a false alert (decision 510, no branch), then alert classification program 204 calculates the severity of the alert, at step 514.

Figure 6:
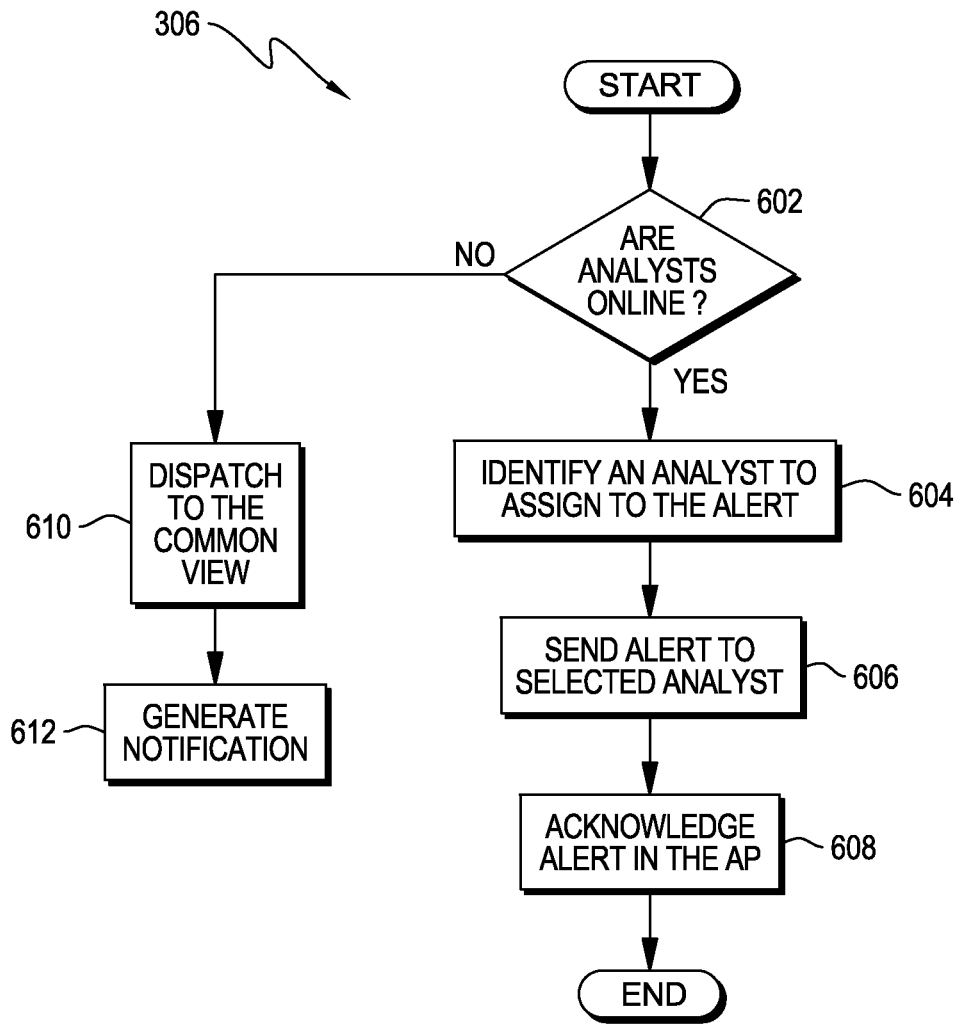
FIG. 6 illustrates in more detail the steps performed by alert assignment program of FIG. 2 for intelligently monitoring and dispatching Information Technology service alerts, according to one embodiment of the present invention.

FIG. 6 illustrates in more detail step 306 of FIG. 3 performed by alert assignment program 206 of FIG. 2 for intelligently monitoring and dispatching Information Technology service alerts, according to one embodiment of the present invention. Alert assignment program 206 first determines if any analysts are online at decision 602. If alert assignment program 206 determines that there are analysts online (decision 602, yes branch), then, at step 604, alert assignment program 206 identifies an analyst to assign the alert to. Alert assignment program 206 then sends the alert to the selected analyst, at step 606. A common queue is available to all analysts to view all system alerts in one view. If alert assignment program 206 determines that there are no analysts online (decision 602, no branch), then, at step 610, alert assignment program 206 places the alert in the common queue. Alert assignment program 206 also generates an un-assigned alert notification, at step 612, and sends the notification to a lead analyst to notify the lead analyst of the un-assigned alert. At step 608, alert assignment program 206 acknowledges the alert. If an alert listed in the common queue is later accepted from the common queue by an available analyst, alert assignment program 206 later generates a second notification for the lead analyst indicating acceptance from the common queue.

Figure 7:
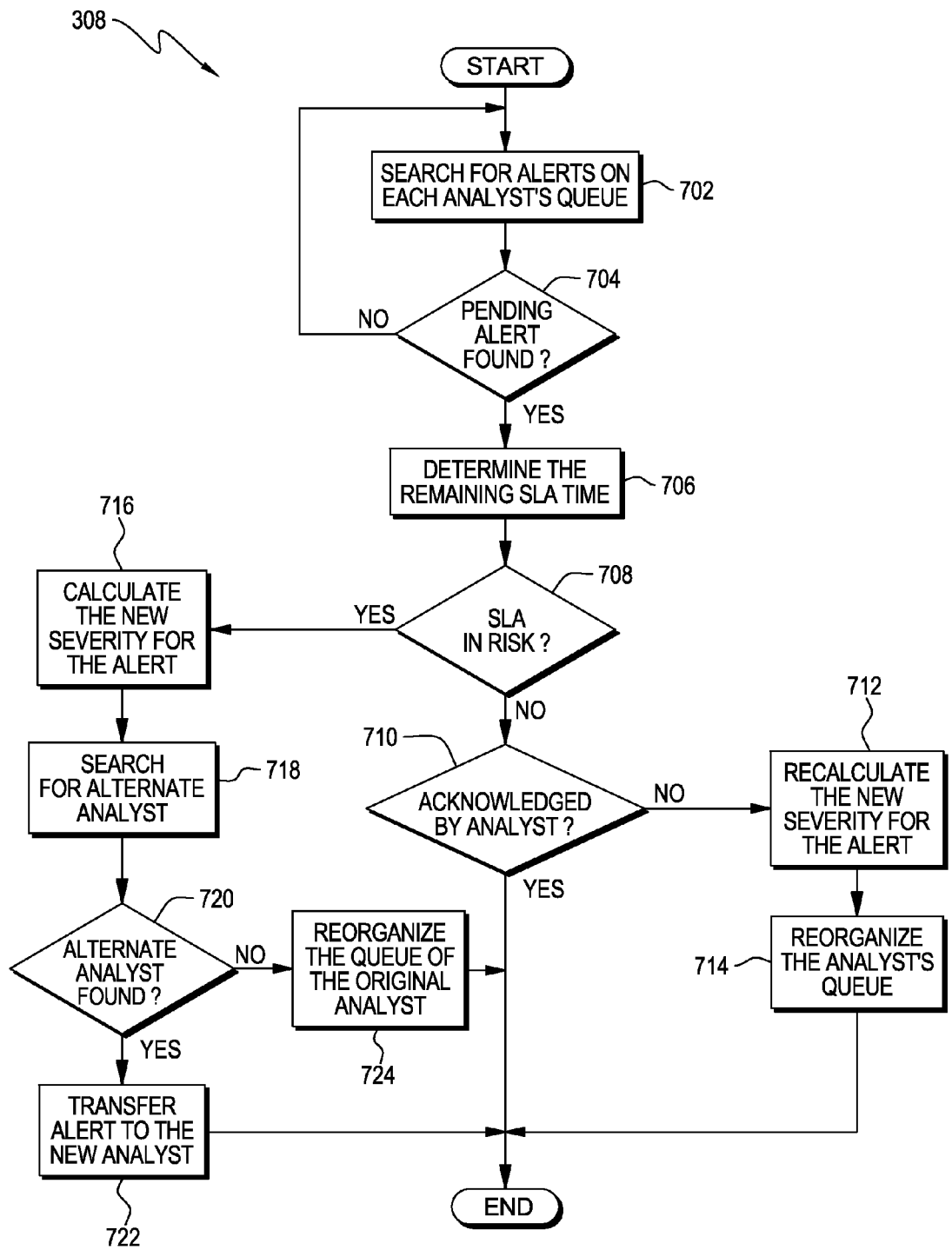
FIG. 7 illustrates in more detail the steps performed by alert monitoring program of FIG. 2 for intelligently monitoring and dispatching Information Technology service alerts, according to one embodiment of the present invention.

FIG. 7 illustrates in more detail step 308 of FIG. 3 performed by alert monitoring program 208 of FIG. 2 for intelligently monitoring and dispatching Information Technology service alerts, according to one embodiment of the present invention. At step 702, alert monitoring program 208 searches for alerts on each analyst's queue. When alert monitoring program 208 finds a pending alert (decision 704, yes branch), alert monitoring program 208, determines, at step 706, the remaining time to process the service alert as defined in an SLA. If alert monitoring program 208 determines that an SLA is not at risk of being violated (decision 708, no branch), but that the assigned analyst has not yet acknowledged the alert (decision 710, no branch), then alert monitoring program 208 re-calculates a new severity at step 712. An SLA is violated, for example, if an alert is not resolved within a predetermined time period. At step 714, alert monitoring program 208 also reorganizes the alert in the analyst's queue at, based on the re-calculated severity.

If alert monitoring program 208 determines that an SLA is at risk of being violated (decision 708, yes branch), alert monitoring program 208 re-calculates a new severity for the alert, at step 716. Alert monitoring program 208 searches for an alternate analyst at step 718. If alert monitoring program 208 identifies an alternate analyst (decision 720, yes branch), alert monitoring program 208 transfers the alert, at step 722, to the alternate analyst. If alert monitoring program 208 does not identify an alternate analyst (decision 720, no branch), alert monitoring program 208 reorganizes the original analysts queue based on the re-calculated severity, at step 724.

Figure 8:
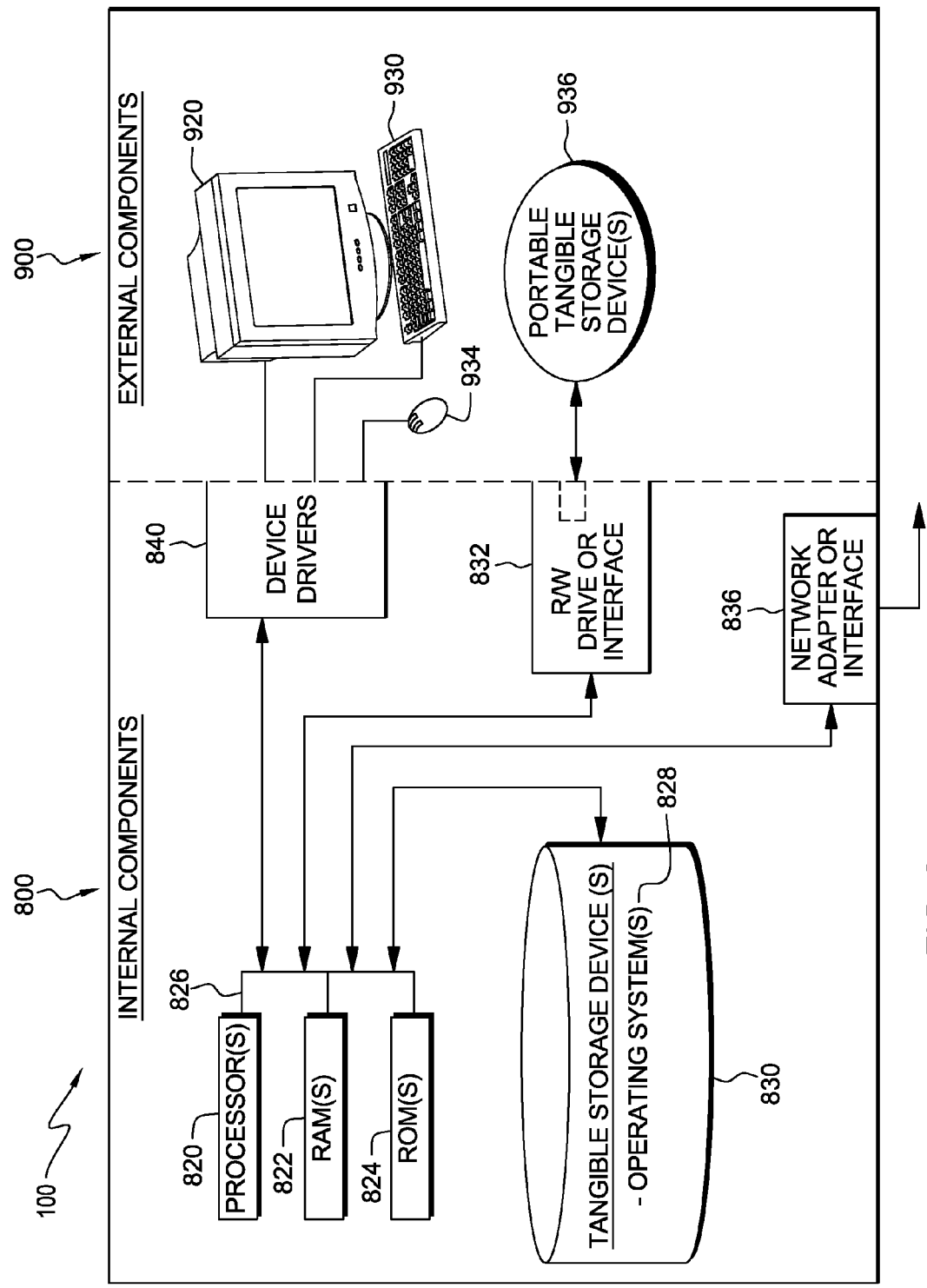
FIG. 8 illustrates internal and external real components of the computer of FIG. 2.

FIG. 8 illustrates hardware and software components of computer system 100 of FIG. 1. Computer system 100 includes internal components 800 and external components 900. Internal components 800 include one or more processors 820, one or more computer-readable RAMs 822 and one or more computer-readable ROMs 824 on one or more buses 826, and one or more operating systems 828 stored on one or more computer-readable storage devices 830. The one or more operating systems 828, alert collection program 202, alert classification program 204, alert assignment program 206, and alert monitoring program 208 are stored on one or more of the computer-readable storage devices 830 for execution by one or more of the processors 820 via one or more of the RAMs 822 (which typically include cache memory). Service level agreement data table 210, known alerts data table 212, characteristics worked data table 214, skill level data table 216, and archive data table 218 are also stored on one or more computer-readable storage devices 830. In the embodiment illustrated in FIG. 8, each of the computer-readable storage devices 830 can be a magnetic disk storage device of an internal hard drive. Alternatively, each of the computer-readable storage devices 830 can be a semiconductor storage device such as ROM 824, EPROM, flash memory or any other computer-readable storage device that can store a computer program and digital information. The term "computer-readable storage device" does not encompass signal propagation media such as copper cables, optical fibers and wireless transmission media.

Internal components 800 also include a R/W drive or interface 832 to read from and write to one or more portable computer-readable storage devices 936 such as a CD-ROM, DVD, memory stick, magnetic tape, magnetic disk, optical disk or semiconductor storage device. The alert collection program 202, alert classification program 204, alert assignment program 206, and alert monitoring program 208 can be stored on one or more portable computer-readable storage devices 936, read through R/W drive or interface 832 and loaded into one or more computer-readable storage devices 830.

Internal components 800 also include a network adapter or interface 836 such as a TCP/IP adapter card. The alert collection program 202, alert classification program 204, alert assignment program 206, and alert monitoring program 208 can be downloaded to computer system 100 from an external computer via a network (for example, the Internet, a local area network or other, wide area network) using network adapter or interface 836. From the network adapter or interface 836, the alert collection program 202, alert classification program 204, alert assignment program 206, and alert monitoring program 208 are loaded into one or more computer-readable storage devices 830. The network may comprise copper wires, optical fibers, wireless transmission, routers, firewalls, switches, gateway computers and/or edge servers.

External components 900 include a computer display monitor 920, a keyboard 930, and a computer mouse 934. Internal components 800 also include device drivers 840 to interface with computer display monitor 920, keyboard 930 and computer mouse 934. Device drivers 840, R/W drive or interface 832 and network adapter or interface 836 comprise hardware and software (stored in one or more computer-readable storage devices 830 and/or one or more computer-readable ROMs 824).

Alert collection program 202, alert classification program 204, alert assignment program 206, and alert monitoring program 208 can be written in various programming languages including low-level, high-level, object-oriented or non object-oriented languages. Alternatively, the functions of alert collection program 202, alert classification program 204, alert assignment program 206, and alert monitoring program 208 can be implemented in whole or in part by computer circuits and other hardware (not shown).

The description above has been presented for illustration purpose only. It is not intended to be an exhaustive description of the possible embodiments. One of ordinary skill in the art will understand that other combinations and embodiments are possible. Accordingly, the above description is intended to embrace all such possible embodiments that fall within the scope of the appended claims.

What is claimed is:

1. A computer system for intelligently monitoring and dispatching Information Technology (IT) service alerts, the system comprising:

one or more processors, one or more computer-readable memories, one or more computer-readable storage devices, a skill level data table for storing a skill level score for each of a plurality of analysts, and program instructions stored on at least one of the one or more storage devices for execution by at least one of the one or more processors via at least one of the one or more memories, the program instructions comprising:

first program instructions to receive a service error alert;

second program instructions to classify the received service error alert;

third program instructions to assign the service error alert to an analyst, from the plurality of analysts, based on the service error alert classification and based on a skill level of the analyst; and fourth program instructions to monitor the progress of the resolution of the service error alert.

2. The computer system of claim 1, further comprising fifth program instructions to determine whether the service error alert is in a predefined format.

3. The computer system of claim 1, further comprising:
a service level agreement data table for storing parameters of a service level agreement, wherein the second program instructions to classify the received service error alert, classify the received service error alert based on the stored parameters.

4. The computer system of claim 3, wherein the second program instructions to classify the received service error alert, classifies the received service error alert as one of known, repeated, false, and normal.

5. The computer system of claim 1, wherein the fourth program instructions to monitor the progress of the resolution of the service error alert determine whether a predetermined action has been performed within a predetermined time period.

6. The computer system of claim 5, further comprising:
sixth program instructions to re-classify the service error alert; and
seventh program instructions to re-assign the service error alert, in response to the fourth program instructions determining that the predetermined action has not been performed within the predetermined time period.

7. A method for intelligently monitoring and dispatching Information Technology (IT) service alerts, the method comprising the steps of:
a computer receiving a service error alert;
a computer classifying the received service error alert;
a computer retrieving a skill level for each of a plurality of analysts from a skill level data table;
a computer assigning the service error alert to an analyst of the plurality of analysts, based on the service error alert classification and based on a skill level of the analyst; and
a computer monitoring the progress of the resolution of the service error alert.

8. The method of claim 7, further comprising the steps of:
a computer determining whether the service error alert is in a predefined format.

9. The method of claim 7, wherein the computer classifies the service error alert by comparing the service error alert to stored parameters in a service level agreement data table.

10. The method of claim 9, wherein the computer classifies the service error alert as one of known, repeated, false, and normal.

11. The method of claim 7, wherein the step of the computer monitoring the progress of the resolution of the service error alert further comprises determining whether a predetermined action has been performed within a predetermined time period.

12. The method of claim 11, further comprising the steps of:
the computer re-classifying the service error alert; and
the computer re-assigning the service error alert, responsive to the computer determining that the predefined action has not been performed within the predetermined time period.

13. A computer program product for intelligently monitoring and dispatching Information Technology (IT) service alerts, the computer program product comprising:
first program instructions to receive a service error alert;
second program instructions to classify the received service error alert;
third program instructions to retrieve a skill level for each of a plurality of analysts from a skill level data table and to assign the service error alert to an analyst, from the plurality of analysts, based on the service error alert classification and further based on a skill level of the analyst; and
fourth program instructions to monitor the progress of the resolution of the service error alert.

14. The computer program product of claim 13, wherein the second program instructions to classify the received service error alert, classify the received service error alert based on the parameters stored in a service level agreement data table.

15. The computer program product of claim 13, wherein the second program instructions to classify the received service error alert, classify the received service error alert as one of known, repeated, false, and normal.

16. The computer program product of claim 13, wherein the fourth program instructions to monitor the progress of the resolution of the service error alert determine whether a predetermined action has been performed within a predetermined time period.

17. The computer program product of claim 16, further comprising:
sixth program instructions to re-classify the service error alert; and
seventh program instructions to re-assign the service error alert, in response to the fourth program instructions determining that the predetermined action has not been performed within the predetermined time period.

* * * * *